United States Patent
Omura et al.

(10) Patent No.: US 8,663,400 B2
(45) Date of Patent: Mar. 4, 2014

(54) LOW ALLOY STEEL FOR HIGH-PRESSURE HYDROGEN GAS ENVIRONMENT AND CONTAINER FOR HIGH-PRESSURE HYDROGEN

(75) Inventors: Tomohiko Omura, Osaka (JP); Mitsuo Miyahara, Osaka (JP); Hiroyuki Semba, Osaka (JP); Masaaki Igarashi, Osaka (JP)

(73) Assignee: Sumitomo Metal Industries, Ltd., Osaka-shi (JP)

( * ) Notice: Subject to any disclaimer, the term of this patent is extended or adjusted under 35 U.S.C. 154(b) by 105 days.

(21) Appl. No.: 12/470,888

(22) Filed: Jun. 12, 2009

(65) Prior Publication Data

US 2009/0285713 A1 Nov. 19, 2009

Related U.S. Application Data

(63) Continuation of application No. PCT/JP2008/066957, filed on Sep. 19, 2008.

(30) Foreign Application Priority Data

Sep. 19, 2007 (JP) ................................. 2007-242973

(51) Int. Cl.
C22C 38/12 (2006.01)
C22C 38/22 (2006.01)
C22C 38/24 (2006.01)

(52) U.S. Cl.
USPC ........... 148/320; 148/330; 148/333; 148/334; 420/111; 420/121; 420/124; 420/127

(58) Field of Classification Search
USPC .......... 148/320, 330, 333, 334; 420/111, 123, 420/127, 121, 124
See application file for complete search history.

(56) References Cited

U.S. PATENT DOCUMENTS 4,851,054 A * 7/1989 Fukuzuka et al. ............ 148/624
7,074,283 B2 * 7/2006 Omura ......................... 148/333

FOREIGN PATENT DOCUMENTS

| CN | 1643174 A | | 7/2005 |
|---|---|---|---|
| CN | 1969053 A | | 5/2007 |
| JP | 361223163 | * | 10/1986 |
| JP | 62-047458 A | | 3/1987 |
| JP | 62-243737 | | 10/1987 |

(Continued)

OTHER PUBLICATIONS

Machine-English translation of Japanese patent 2005-350754, Omura et al., Dec. 22, 2005.*

(Continued)

Primary Examiner — Deborah Yee
(74) Attorney, Agent, or Firm — Marshall, Gerstein & Borun LLP

(57) ABSTRACT

Provided is a low alloy steel for high-pressure hydrogen gas environments, which contains, by mass percent, C: 0.15 to 0.60%, Si: 0.05 to 0.5%, Mn: 0.05 to 3.0%, P: not more than 0.025%, S: not more than 0.010%, Al: 0.005 to 0.10%, Mo: 0.5 to 3.0%, V: 0.05 to 0.30%, O (oxygen): not more than 0.01%, N: not more than 0.03%, and the balance Fe and impurities, and has tensile strength of not less than 900 MPa. This low alloy steel desirably contains B of 0.0003 to 0.003%, but in this case, N is limited to not more than 0.010%. It is desirable to contain at least one among Cr, Nb, Ti, Zr, and Ca. The contents of Mo and V desirably satisfy the following formula (1):

$$[Mo(\%)] \cdot [V(\%)]^{0.2} \geq 0.32 \qquad (1).$$

6 Claims, 2 Drawing Sheets

(56) References Cited

FOREIGN PATENT DOCUMENTS

| | | | |
|---|---|---|---|
| JP | 2005/002386 | | 1/2005 |
| JP | 2005/139499 | | 6/2005 |
| JP | 2005-350754 | * | 12/2005 |
| WO | WO2004/111291 | | 6/2004 |

OTHER PUBLICATIONS

Machine-English translation 2005-139499, Kumagai Masashi et al., Jun. 2, 2005.*

Machine-English translation of 408120400, Masamitsu Murai et al,, May 14, 1996.*

Tamura Motonori et al., "Evaluation of Mechanical Properties of Metals at 45 MPa Hydrogen," J. Japan Inst. Metals, vol. 69, No. 12 (2005), 1039-1048.

Hinotani Shigeharu et al., "Hydrogen Embrittlement of High Strength Steels in High Pressure Hydrogen Gas at Ambient Temperature," Tetsu-to-Hagane, 64th years. No. 7 (1978), 899-905.

Japanese language International Search Report in corresponding PCT/JP2008/066957 dated Dec. 22, 2008.

Japanese language Written Opinion in corresponding PCT/JP2008/066957 dated Dec. 22, 2008.

"Abrazo 400: Abrasion Resistant Steel Plate," British Steel Company Brochure (Jun. 1999).

"RQT701 High Strength Steel Plate," British Steel Company Brochure (Jun. 1999).

"ISG Plate A514 "T-1"®," International Steel Group Inc. Brochure (Jul. 2004).

"How to Weld "T-1"® Constructed Alloy Steels," International Steel Group Inc. Brochure (Jul. 2004).

Third Party Observation for Application No. EP08832156, dated Dec. 14, 2011.

* cited by examiner

LOW ALLOY STEEL FOR HIGH-PRESSURE HYDROGEN GAS ENVIRONMENT AND CONTAINER FOR HIGH-PRESSURE HYDROGEN

The disclosure of International Application No. PCT/JP2008/066957 filed Sep. 19, 2008 including specification, drawings and claims is incorporated herein by reference in its entirety.

TECHNICAL FIELD

The present invention relates to a low alloy steel suitably used in high-pressure hydrogen gas environments, and to a container made of the steel and used for high-pressure hydrogen.

BACKGROUND ART

Fuel cell vehicles, which are fueled by hydrogen and oxygen, obtain electric power without exhausting hazardous substances such as carbon dioxide ($CO_2$), nitrogen oxide ($NO_x$), and sulfur oxide ($SO_x$), and thus have attracted attention as clean vehicles of the next generation in place of gasoline vehicles and diesel engine vehicles. In Japan, commercial sale of fuel cell vehicles carrying hydrogen gas cylinders started in 2002, and the fuel cell vehicles for sale are increasing in number year by year. However, the current fuel cell vehicles can travel only as far as 300 km due to dimensional restrictions of the cylinders, and this has posed an obstacle to the wide use of these vehicles. In order to improve the travel distance, it is effective to make the pressure of the hydrogen gas accommodated in on-board cylinders, as high as 35 to 70 MPa, and thus various kinds of equipment associated with hydrogen gas, such as storage containers, pipes, and injection valves, need to use safe materials in the high-pressure hydrogen environment.

However, the use of steel materials in a hydrogen gas environment, particularly a high-pressure hydrogen gas environment, poses the problem of hydrogen embrittlement caused by the hydrogen gas. This phenomenon is called "Hydrogen Environment Embrittlement (HEE)," which is known as a phenomenon which degrades the mechanical properties of metallic materials, such as ductility and rupture stress in hydrogen gas environment. In Japan, various material evaluations have been carried out since research on the basic physical properties of material for hydrogen started in 2003 in "basic technical development on safe utilization of hydrogen" of New Energy and Industrial Technology Development Organization (NEDO).

This resulted in papers such as non-patent document 1. Non-patent document 1 mentions an aluminum alloy A6061-T6 and also a stable austenitic stainless steel SUS316L, as examples of the metallic material hardly embrittled in a high-pressure hydrogen gas environment. These metallic materials have a fcc (face-centered cubic) structure, which is generally believed to hardly involve hydrogen embrittlement. The result of the research is believed to serve as a basis for High Pressure Gas Safety Law, Section 3 (material) of the Standardized Examples for Hydrogen Fuel Containers for Compressed Hydrogen-fuel Vehicles. However, with the A6161-T6 having a tensile strength of no more than approximately 300 MPa, and with the SUS type austenitic stainless steel having a tensile strength of no more than approximately 500 to 600 MPa, they cannot sufficiently meet the demand for even higher strength in order to reduce the weight of on-board containers.

High-strength low alloy steels are tempting for the above demand because they have high strength and realize reduction in production cost, but they have a bcc (body-centered cubic) structure, which is believed to be highly susceptible to hydrogen embrittlement; in particular, the embrittlement susceptibility is known to increase as the strength increases. Among very few evaluations ever conducted for detailed properties of low alloy steel in a high-pressure hydrogen environment, non-patent document 2 reports an experiment using low alloy steels (AISI4340 steel, 4130 steel, and high manganese steel) as specimens, where the embrittlement susceptibility increases when the tensile strength exceeds 900 MPa. Thus, although some of the low alloy steel containers are being applied to pressure accumulators at hydrogen stations on the condition that regular maintenance is conducted. It is generally believed difficult to apply low alloy steels to on-board containers, because they are difficult to regularly maintain.

In patent document 1, the applicant proposes an invention related to a steel product for a cylinder, consisting of, by mass percent, C, 0.20 to 0.35%, Si: ≤0.35, Mn: 0.3 to 2.0%, P: ≤0.025%, S: ≤0.015%, Cr: 0.8 to 2.0%, Mo: 0.3 to 1.0%, B: 0.0005 to 0.0030%, Al: 0.01 to 0.10%, and N: ≤0.008%, or further at least one selected from Nb: ≤0.10%, Ti: ≤0.10%, Cu: ≤2.00%, Ni: ≤2.00%, V: ≤0.10%, and Ca: ≤0.010%, and the balance Fe and impurities.

[Patent document 1] Japanese Patent Laid-open No. 2005-139499
[Non-patent document 1] Tamura Motonori et al., "Evaluation of Mechanical Properties of Metals at 45 MPa Hydrogen", *J. Japan Inst. Metals*, vol. 69, No. 12 (2005), 1039-1048.
[Non-patent document 2] Hinotani Shigeharu et al., "Hydrogen Embrittlement of High Strength Steels in High Pressure Hydrogen Gas at Ambient Temperature", *Tetsu-to-Hagane*, 64th year, No. 7 (1978), 899-905.

DISCLOSURE OF THE INVENTION

Problems to be Solved by the Invention

The invention described in patent document 1 provides a high-strength steel product suitable for use in a cylinder with a particularly thin wall thickness. However, it is important to keep in mind that the inner pressure of this invention is approximately 24.5 MPa, as described in an example of the publication; thus, the publication gives no consideration to the extra high pressure of 35 to 70 MPa, which is required of on-board cylinders.

Pressure accumulators for hydrogen stations and so forth use Cr—Mo containing steel (steel containing, by mass percent, C of 0.35 to 0.40%, Cr of approximately 1%, and Mo of not more than 0.2%) specified by JIS-SCM435, JIS-SCM440, and the like. These steels are ordinarily subjected to adjustment of strength by quenching and tempering. However, as described in non-patent document 2, low alloy steels with a tensile strength exceeding 900 MPa tend to increase the embrittlement susceptibility, and it is difficult to use these existing steels as they are in a high-pressure hydrogen gas environment.

It is an objective of the present invention to provide a low alloy steel with an excellent resistance to an hydrogen environment embrittlement while securing the strength at as high as 900 MPa tensile strength, and a container made of the low alloy steel.

Means to Solve the Problems

The present inventors conducted a detailed study of the form of the embrittlement fracture surfaces of these existing steels in a hydrogen environment, and have found that this kind of fracture is a prior austenite grain boundary fracture and that the resistance to a hydrogen environment embrittlement can be made more acceptable by improving the carbide form of the grain boundary. An extensive study has resulted in the knowledge that the resistance to the hydrogen environment embrittlement can be remarkably improved by adding V and increasing the Mo content in the existing steel, which has led to the completion of the present invention.

The points of the present invention are a low alloy steel used in a high-pressure gas environment defined below (A) and a container for high-pressure hydrogen defined below (B).

(A) A low alloy steel used in a high-pressure hydrogen gas environment, characterized in that it contains, by mass percent, C, 0.15 to 0.60%, Si: 0.05 to 0.5%, Mn: 0.05 to 3.0%, P: not more than 0.025%, S: not more than 0.010%, Al: 0.005 to 0.10%, Mo: 0.5 to 3.0%, V: 0.05 to 0.30%, O (oxygen): not more than 0.01%, N: not more than 0.03%, and the balance Fe and impurities, and tensile strength is not less than 900 MPa.

Additionally, it is desirable that the low alloy steel used in a high-pressure hydrogen gas environment described in (A) further contains, by mass percent, B of 0.0003 to 0.003%. However, in this case, the N content needs to be limited to not more than 0.010%. This low alloy steel used in a high-pressure hydrogen gas environment desirably further contains, by mass percent, at least one selected from Cr: 0.2 to 2.0%, Nb: 0.002 to 0.1%, Ti: 0.002 to 0.1%, Zr: 0.002 to 0.1%, and Ca: 0.0003 to 0.01%. It is also desirable that the contents of Mo and V satisfy the following formula (1):

$$[Mo(\%)] \cdot [V(\%)]^{0.2} \geq 0.32 \quad (1)$$

(B) A container for high-pressure hydrogen made of the low alloy steel used in a high-pressure hydrogen gas environments described in (A).

Effects of the Invention

The low alloy steel of the present invention has high tensile strength, such as 900 MPa or higher, even though the steel is excellent in resistance to hydrogen environment embrittlement in a high-pressure hydrogen gas environment.

Figure 1:
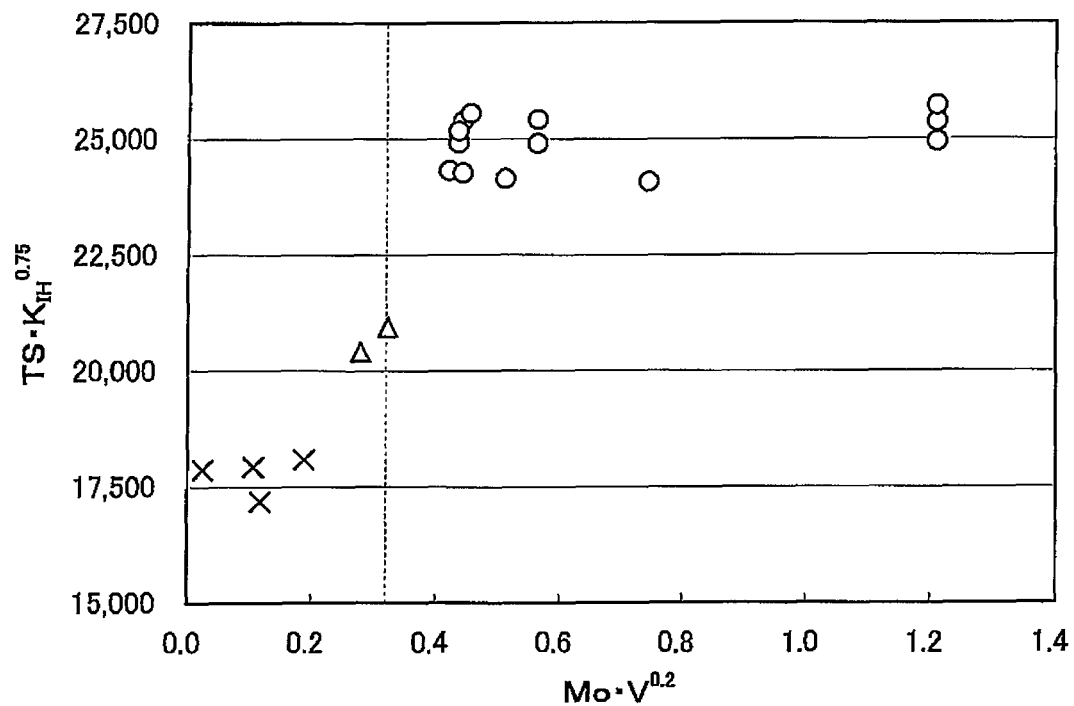
FIG. 1 is a graphic representation of the relations between $TS \cdot K_{IH}^{0.75}$ and $[Mo(\%)] \cdot [V(\%)]^{0.2}$.

BEST MODE FOR CARRYING OUT THE INVENTION (a) Chemical Composition
Hereinafter, the chemical composition of the low alloy steel of the present invention and the grounds for restriction will be described below. In the following explanations, "%" of each element means "mass percent."

C: 0.15 to 0.60%
C is an effective element for enhancing hardenability and improving the strength. It is necessary to contain C at not less than 0.15% in order to obtain the effect. However, when the content exceeds 0.60%, the effects are saturated. Therefore, the content of C was set to 0.15 to 0.60%.

Si: 0.05 to 0.5%
Si is an effective element for deoxidation of steel, and also enhances tempering softening resistance. It is necessary to contain Si at not less than 0.05% in order to obtain the deoxidation effect. However, when the content exceeds 0.5%, Si promotes precipitation of a ferrite phase of a softening phase, thereby lowering it's strength. Therefore, the content of Si was set at the range of 0.05 to 0.5%.

Mn: 0.05 to 3.0%
Mn is an effective element for securing the hardenability of steel. It is necessary to contain Mn at not less than 0.05% in order to obtain the above effect. However, when the content exceeds 3.0%, Mn segregates in the grain boundary together with impurity elements such as P and S, thereby lowering mechanical properties such as toughness. Therefore, the content of Mn was set to 0.05 to 3.0%.

P: not more than 0.025%
P is an element which segregates in the grain boundary, thereby lowering mechanical properties such as toughness. When the content exceeds 0.025%, the influence of P becomes notable. Therefore, P was limited to not more than 0.025%.

S: not more than 0.010%
S is an element which segregates in the grain boundary in the same manner as P, thereby lowering mechanical properties such as toughness. When the content exceeds 0.010%, the influence of S becomes notable. Therefore, S was limited to not more than 0.010%.

Al: 0.005 to 0.10%
Al is an effective element for deoxidation of steel. The effect cannot be obtained when the Al content is less than 0.005%. On the other hand, when the content exceeds 0.10%, the effect is saturated. Therefore, the Al content was set to 0.005 to 0.10%. Additionally, the Al content of the present invention refers to acid-soluble Al (sol. Al).

Mo: 0.5 to 3.0%
Mo is an important element in the present invention and forms fine V—Mo carbides together with V so as to effectively increase the tempering temperature and improve the resistance to hydrogen environment embrittlement. This effect exhibits at a content of not less than 0.5%. On the other hand, when the content exceeds 3.0%, the effect is saturated. Therefore, the content of Mo was set to 0.5 to 3.0%. The lower limit is desirably 0.65%. The upper limit is desirably 2.5%.

V: 0.05 to 0.30%
V is an important element in the present invention and forms fine V—Mo carbides together with Mo so as to effectively increase the tempering temperature and improve the resistance to hydrogen environment embrittlement. From this viewpoint, it is necessary to contain at least 0.05% of V. However, when the content exceeds 0.30%, the effect of increasing the tempering temperature is saturated because there is no increase in solid-soluble V during quenching. Therefore, the content of V was set to 0.05 to 0.30%. The lower limit is desirably 0.08%. The upper limit is desirably 0.25%.

O (oxygen): not more than 0.01%
O (oxygen) is present in the steel as an impurity, and when the content exceeds 0.01%, a large oxide is formed which lowers mechanical properties such as toughness. Therefore, O (oxygen) was limited to not more than 0.01%.

N (nitrogen): not more than 0.03%, or not more than 0.010% in the case where B of 0.0003 to 0.003% is contained in the steel.

N is an element present in the steel as an impurity and forms, together with C, carbonitrides of Al or, further Nb, Ti or Zr and refines grains of the steel due to their pinning effects, thereby improving mechanical properties such as toughness. While this effect exhibits even when the N content is very small, the effect becomes notable at not less than 0.01% in particular. However, when the content exceeds 0.03%, the above-mentioned effect is saturated. Therefore, the N content was set to not more than 0.03%.

It should be noted that when the steel is enhanced in hardenability by containing B, and thus when B nitride (BN) is formed, then the hardenability is insufficiently improved. Therefore, the N content needs to be limited to not more than 0.010%. It is desirable to fix N as a Ti nitride or a Zr nitride.

The low alloy steel of the present invention has the above-described elements, with the balance Fe and impurities. For the purpose of improving mechanical properties, the low alloy steel may contain, in addition to B of 0.0003 to 0.003%, at least one selected from Cr of 0.2 to 2.0%, Nb of 0.002 to 0.1%, Ti of 0.002 to 0.1%, Zr of 0.002 to 0.1% and Ca of 0.0003 to 0.01%.

B: 0.0003 to 0.003%

B may not be contained, but when contained, it improves hardenability of the steel. The effect becomes notable at not less than 0.0003%. However, an excessive content promotes generation of a grain boundary large carbide, $M_{23}C_6$ (M being Fe, Cr, or Mo), thereby lowering mechanical properties such as toughness. Therefore, the B content is desirably 0.0003 to 0.003% in the case of containing B. Additionally, for obtaining the effect of adding B sufficiently, the N content needs to be limited to not more than 0.010% so as to prevent B from turning into B nitride (BN). It is desirable to fix N as Ti nitride or Zr nitride.

Cr: 0.2 to 2.0%

Cr may not be contained, but when contained, it improves hardenability of the steel and increases the strength. The effect becomes notable when the Cr content is not less than 0.2%. However, an excessive content promotes generation of a grain boundary large carbide, $M_{23}C_6$ (M being Fe, Cr, or Mo), thereby lowering mechanical properties such as toughness. Therefore, the Cr content is desirably 0.2 to 2.0% in the case of containing Cr.

Nb: 0.002 to 0.1%
Ti: 0.002 to 0.1%
Zr: 0.002 to 0.1%

Nb, Ti, and Zr are effective elements that all combine with C and N to form carbonitrides and refine grains of the steel due to their pinning effects so as to improve mechanical properties such as toughness. This effect becomes notable when the content of each element is not less than 0.002%. However, when the content of each element exceeds 0.1%, the effect is saturated. Therefore, the content of each element is desirably 0.002 to 0.1% in the case of containing these elements.

Ca: 0.0003 to 0.01%

Ca combines with S in the steel to form sulfide and improves the shape of an inclusion, thereby improving mechanical properties such as toughness. This effect becomes notable when the content is not less than 0.0003%. However, when the Ca content exceeds 0.01%, the effect is saturated. Therefore, the Ca content is desirably 0.0003 to 0.01% in the case of containing Ca.

It is desirable that the contents of Mo and V satisfy the following formula (1), the grounds of which will be described below.

$$[Mo(\%)] \cdot [V(\%)]^{0.2} \geq 0.32 \quad (1)$$

FIG. 1 is a graphic representation of the relations between $TS \cdot K_{IH}^{0.75}$ and $[Mo(\%)] \cdot [V(\%)]^{0.2}$ as a result of the Example below. $TS \cdot K_{IH}^{0.75}$ is an index of balance between the tensile strength and the resistance to the hydrogen environment embrittlement (see Example) and indicates that when this value becomes larger, both of a tensile strength and a resistance to hydrogen environment embrittlement are superiority.

As shown in FIG. 1, $TS \cdot K_{IH}^{0.75}$ increases rapidly when $[Mo(\%)] \cdot [V(\%)]^{0.2}$ approximately exceeds 0.2, becomes 20000 when $[Mo(\%)] \cdot [V(\%)]^{0.2}$ is 0.32, reaches 25000 when $[Mo(\%)] \cdot [V(\%)]^{0.2}$ is 0.4, and then is almost saturated. Thus, the balance between the tensile strength and the resistance to the hydrogen environment embrittlement improves when $[Mo(\%)] \cdot [V(\%)]^{0.2}$ is not less than 0.32, that is, in the case where the foregoing formula (1) is satisfied. Additionally, it is desirable that $[Mo(\%)] \cdot [V(\%)]^{0.2}$ is not less than 0.4, that is, in the case where the following formula (1a) is satisfied.

$$[Mo(\%)] \cdot [V(\%)]^{0.2} \geq 0.4 \quad (1a)$$

(b) Production Method (The production method of the steel product is not particularly limited. The steel product may be produced by a method such as hot forging and hot rolling from an ingot produced by a usual method. While in Examples described later, the test results are obtained from the high-pressure hydrogen containers using plate materials, the high-pressure hydrogen containers are not limited to those using plate materials as raw materials; for example, a high-pressure hydrogen container using a seamless steel pipe as a raw material may be produced by a method usually adopted in the production of seamless steel pipes, similarly to the case of plate materials.

Relating to a heat treatment of the steel, it is desirable to carry out quenching and tempering treatment so as to obtain a good resistance to hydrogen environment embrittlement. Quenching is desirably carried out at temperatures of not less than 900° C. so as to secure a sufficient solid-solution of carbide-generating elements such as Cr, Mo, and V. For cooling during quenching, it is preferable to adopt water cooling when the C (carbon) content is not more than 0.3%, while adopting oil cooling or shower cooling when the C (content is more than 0.3%, so as to prevent quenching cracking.

EXAMPLES

Hereinafter, Examples to validate the effects of the present invention will be described.

Steels having chemical compositions shown in Table 1 were produced by melting and hot-forged into blocks of 40 mm thick. These blocks were hot-rolled into plate materials of 12 mm thick. The plate materials were kept at 880 to 920° C. and were quenched by water-cooling or oil-cooling. Then, the plate materials were subjected to tempering treatment comprising the steps of keeping the plate materials at 500 to 720° C. and cooling in order to adjust the tensile strength at 800 to 1200 MPa, thus obtaining test specimens. The test specimens were subjected to a tensile test and the following hydrogen environment embrittlement test.

<Hydrogen Environment Embrittlement Test>

This test was carried out based on the "2.2 Breaking test method in high-pressure hydrogen" of "2. Steel under test and Experimental methodology" described in Non-patent document 1. The specimens used here were DCB (Double Cantilever Beam) specimens specified by the TM0177-2005 D method of NACE (National Association of Corrosion Engineers: American Petroleum Institute). The test environment was a high-pressure hydrogen gas environment of 45 MPa at a normal temperature. Wedged DCB specimens were exposed to this environment for 336 hours so as to measure $K_{IH}$ values. The $K_{IH}$ values were calculated in accordance with a formula specified by the NACE TM0177-2005 D method, and based on a wedge-release stress obtained by a tensile test of the arm of each specimen in a normal temperature atmosphere after the test, on the actual measured values of the length of cracking.

[Table 1]

TABLE 1

Chemical Composition (mass %, the balance Fe and impurities)

| Steel | C | Si | Mn | P | S | Al | Mo | V | O | N | B | Cr | Nb | Ti | Zr | Ca | $\frac{[Mo]}{[V]^{0.2}}$ |
|---|---|---|---|---|---|---|---|---|---|---|---|---|---|---|---|---|---|
| A | 0.27 | 0.20 | 0.45 | 0.008 | 0.001 | 0.030 | 0.70 | 0.10 | 0.0018 | 0.004 | — | 1.25 | — | — | — | — | 0.44 |
| B | 0.38 | 0.21 | 0.47 | 0.008 | 0.001 | 0.021 | 0.72 | 0.10 | 0.0011 | 0.010 | — | 1.25 | 0.033 | — | — | — | 0.45 |
| C | 0.48 | 0.20 | 0.44 | 0.007 | 0.001 | 0.034 | 0.68 | 0.09 | 0.0015 | 0.011 | — | 1.01 | 0.034 | — | — | — | 0.42 |
| D | 0.39 | 0.13 | 0.45 | 0.007 | 0.008 | 0.025 | 0.75 | 0.24 | 0.0022 | 0.012 | — | 1.32 | 0.018 | 0.014 | — | — | 0.56 |
| E | 0.40 | 0.11 | 0.39 | 0.011 | 0.006 | 0.030 | 0.99 | 0.24 | 0.0018 | 0.015 | — | 1.22 | — | 0.015 | — | — | 0.74 |
| F | 0.28 | 0.20 | 0.44 | 0.009 | 0.001 | 0.033 | 0.69 | 0.10 | 0.0017 | 0.004 | 0.0010 | 0.49 | 0.030 | 0.015 | — | — | 0.44 |
| G | 0.26 | 0.20 | 0.45 | 0.008 | 0.001 | 0.034 | 0.69 | 0.10 | 0.0023 | 0.004 | 0.0009 | 0.98 | 0.030 | 0.014 | — | — | 0.44 |
| H | 0.27 | 0.20 | 0.45 | 0.011 | 0.002 | 0.036 | 1.92 | 0.10 | 0.0021 | 0.004 | 0.0010 | — | 0.028 | 0.014 | — | — | 1.21 |
| I | 0.38 | 0.10 | 0.41 | 0.013 | 0.005 | 0.035 | 1.92 | 0.10 | 0.0020 | 0.011 | — | — | — | — | — | — | 1.21 |
| J | 0.27 | 0.28 | 0.50 | 0.001 | 0.001 | 0.034 | 0.70 | 0.10 | 0.0020 | 0.003 | 0.0003 | 0.52 | 0.032 | 0.014 | — | 0.0018 | 0.44 |
| K | 0.37 | 0.11 | 0.38 | 0.009 | 0.004 | 0.034 | 0.68 | 0.24 | 0.0013 | 0.004 | — | 1.21 | 0.029 | 0.015 | 0.051 | — | 0.51 |
| L | 0.26 | 0.24 | 0.43 | 0.009 | 0.005 | 0.070 | 0.55 | 0.07 | 0.0015 | 0.005 | 0.0012 | 0.98 | 0.026 | 0.026 | — | — | 0.32 |
| M | 0.25 | 0.18 | 0.82 | 0.015 | 0.001 | 0.034 | 0.51 | 0.05 | 0.0013 | 0.005 | 0.0013 | 0.30 | — | 0.015 | — | 0.0014 | 0.28* |
| N | 0.39 | 0.20 | 0.82 | 0.025 | 0.010 | 0.026 | 0.16* | —* | 0.0021 | 0.004 | — | 1.11 | — | — | — | — | 0.00* |
| O | 0.25 | 0.28 | 0.45 | 0.007 | 0.001 | 0.073 | 0.68 | —* | 0.0013 | 0.008 | 0.0011 | 1.00 | 0.026 | 0.012 | — | — | 0.00* |
| P | 0.38 | 0.10 | 0.39 | 0.008 | 0.005 | 0.036 | 0.16* | 0.23 | 0.0013 | 0.011 | — | 1.25 | 0.025 | 0.014 | — | — | 0.12* |
| Q | 0.29 | 0.29 | 0.48 | 0.001 | 0.001 | 0.030 | 0.30* | 0.10 | 0.0016 | 0.001 | — | 0.50 | 0.031 | 0.013 | — | — | 0.19* |

*means it does not satisfy the range defined by the present invention.

[Table 2]

TABLE 2

| No. | Steel | TS (MPa) | $K_{IH}$ (MPa·m$^{0.5}$) | classification |
|---|---|---|---|---|
| 1 | A | 940 | 81 | Example of the present invention |
| 2 | B | 913 | 85 | Example of the present invention |
| 3 | C | 964 | 74 | Example of the present invention |
| 4 | D | 908 | 85 | Example of the present invention |
| 5 | D | 1018 | 71 | Example of the present invention |
| 6 | E | 964 | 73 | Example of the present invention |
| 7 | F | 916 | 82 | Example of the present invention |
| 8 | F | 1052 | 68 | Example of the present invention |
| 9 | G | 941 | 80 | Example of the present invention |
| 10 | H | 914 | 84 | Example of the present invention |
| 11 | H | 1115 | 63 | Example of the present invention |
| 12 | I | 935 | 83 | Example of the present invention |
| 13 | J | 916 | 79 | Example of the present invention |
| 14 | K | 929 | 77 | Example of the present invention |
| 15 | L | 915 | 65 | Example of the present invention |
| 16 | M | 913 | 63 | Example of the present invention |
| 17 | N | 873 | 56 | Comparative example |
| 18 | O | 888 | 55 | Comparative example |
| 19 | P | 875 | 53 | Comparative example |
| 20 | Q | 861 | 58 | Comparative example |

As shown in Table 2, all of the test numbers 1 to 16, which are Examples of the present invention, have $K_{IH}$ values of not less than 60. These steels contain more Mo than conventional JIS-SCM435 or JIS-SCM440 steels, and further the steels contain V, and therefore there are a large number of fine V—Mo carbides. It is believed that the fine carbides contribute to high-temperature tempering, and that spheroidizing and uniform dispersion of grain boundary carbides such as cementite improves the resistance to hydrogen environment embrittlement. These V—Mo based carbides possibly act as trap sites of hydrogen, thereby contributing to improvement of the resistance to hydrogen environment embrittlement. Test numbers 5, 8, and 11 in Table 2 are results of evaluations with tensile strengths of not less than 1000 MPa; they show still higher $K_{IH}$ values than those of test numbers 17 to 20, which are comparative examples.

Test numbers 17 to 20, which are comparative examples, have low $K_{IH}$ values compared with the steels of the invention despite having tensile strengths of less than 900 MPa, thus these have a risk of hydrogen environment embrittlement. In particular, test numbers 17 and 18, which respectively use steel N (JIS-SCM435) and steel O without V, have low tempering temperatures and thus cannot obtain sufficient hydrogen environment embrittlement resistance properties. Test numbers 19 and 20, which respectively use steels P and Q with V but a low Mo content, cannot obtain sufficient hydrogen environment embrittlement resistance properties.

Figure 2:
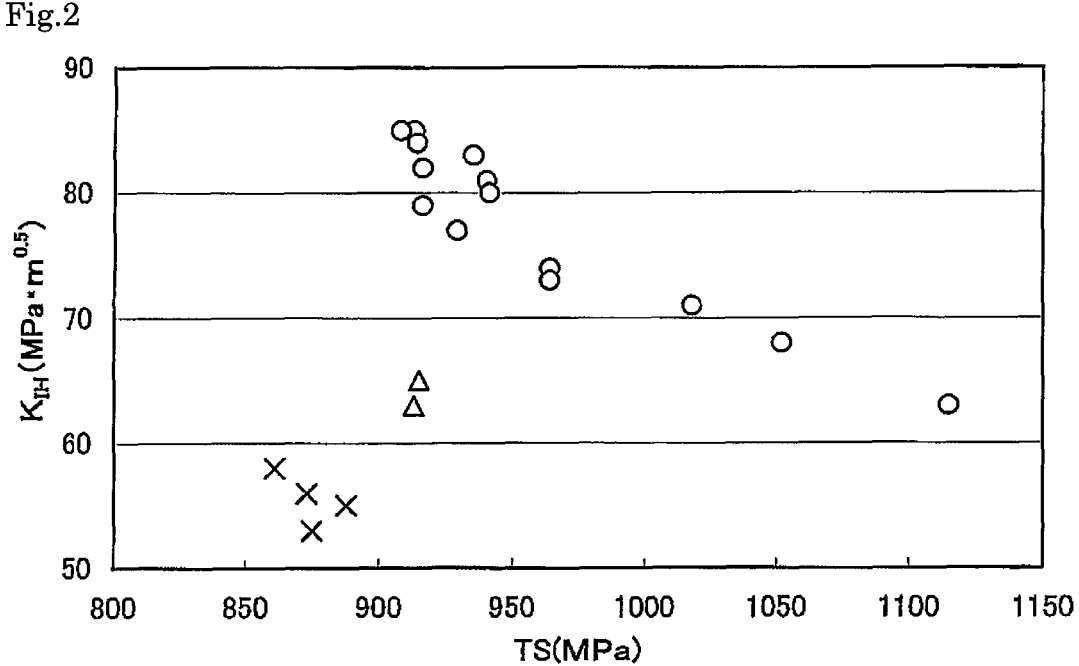
FIG. 2 is a graphic representation of the relations between $K_{IH}$ and TS.
Figure 3:
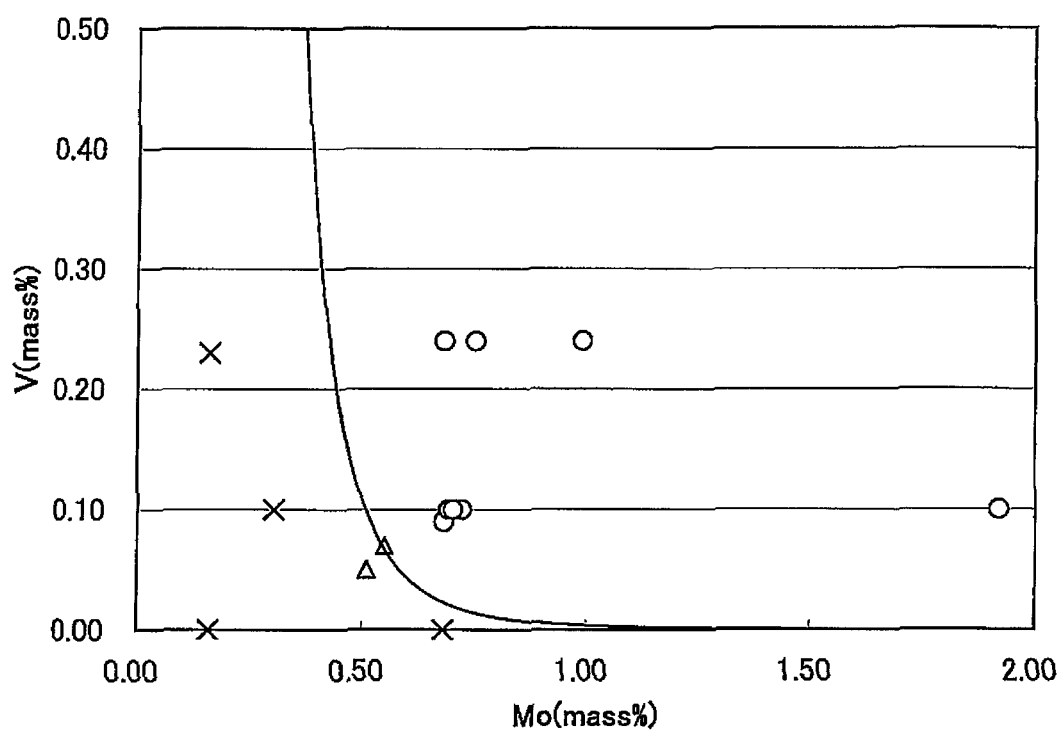
FIG. 3 is a graphic representation of the relations between the contents of V and Mo.

FIGS. 2 and 3 show the results of the Examples. FIG. 2 is a graphic representation of the relations between $K_{IH}$ and TS, and FIG. 3 is a graphic representation of the relations between the contents of V and Mo. In FIGS. 2 and 3, "○" indicates test numbers 1 to 14 (examples of the invention), "Δ" indicates test numbers 15 and 16 (examples of the invention), and "x" indicates test numbers 17 to 20 (comparative example). The curve shown in FIG. 3 is a curve satisfying [Mo(%)]·[V(%)]$^{0.2}$=0.32. As shown in FIGS. 2 and 3, Examples of the invention, which satisfy the formula (1), have high levels of tensile strength and resistance to hydrogen environment embrittlement compared with comparative examples.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The low alloy steel of the present invention has high tensile strength such as 900 MPa or higher, even though the steel is excellent in resistance to hydrogen environment embrittlement in a high-pressure hydrogen gas environment, and thus finds applications in steel products used for containers for high-pressure hydrogen.

The invention claimed is:
1. A container for high-pressure hydrogen made of a low alloy steel consisting of, by mass percent, C: 0.38 to 0.60%, Si: 0.05 to 0.5%, Mn: 0.05 to 3.0%, P: not more than 0.025%, S: not more than 0.010%, Al: 0.005 to 0.10%, Mo: 0.5 to

3.0%, V: 0.05 to 0.30%, O (oxygen): not more than 0.01%, N: not more than 0.03%, and the balance Fe and impurities, and the said steel having tensile strength of not less than 900 MPa, wherein the contents of Mo and V satisfy the following formula (1):

$$[Mo(\%)]\cdot[V(\%)]^{0.2} \geq 0.4 \qquad (1).$$

2. A container for high-pressure hydrogen made of a low alloy steel consisting of, by mass percent, C: 0.38 to 0.60%, Si: 0.05 to 0.5%, Mn: 0.05 to 3.0%, P: not more than 0.025%, S: not more than 0.010%, Al: 0.005 to 0.10%, Mo: 0.5 to 3.0%, V: 0.05 to 0.30%, O (oxygen): not more than 0.01%, B: 0.0003 to 0.003%, N: not more than 0.010%, and the balance Fe and impurities, and the said steel having tensile strength of not less than 900 MPa, wherein the contents of Mo and V satisfy the following formula (1):

$$[Mo(\%)]\cdot[V(\%)]^{0.2} \geq 0.4 \qquad (1).$$

3. A container for high-pressure hydrogen, made of a low alloy steel consisting of, by mass percent, C: 0.38 to 0.60%, Si: 0.05 to 0.5%, Mn: 0.05 to 3.0%, P: not more than 0.025%, S: not more than 0.010%, Al: 0.005 to 0.10%, Mo: 0.5 to 3.0%, V: 0.05 to 0.30%, O (oxygen): not more than 0.01%, N: not more than 0.03%, one element selected from Cr: 0.2 to 2.0%, Nb: 0.002 to 0.1%, Ti: 0.002 to 0.1%, Zr: 0.002 to 0.1% and Ca: 0.0003 to 0.01%, and the balance Fe and impurities, and the said steel having tensile strength of not less than 900 MPa, wherein the contents of Mo and V satisfy the following formula (1):

$$[Mo(\%)]\cdot[V(\%)]^{0.2} \geq 0.4 \qquad (1).$$

4. A container for high-pressure hydrogen, made of a low alloy steel consisting of, by mass percent, C: 0.38 to 0.60%, Si: 0.05 to 0.5%, Mn: 0.05 to 3.0%, P: not more than 0.025%, S: not more than 0.010%, Al: 0.005 to 0.10%, Mo: 0.5 to 3.0%, V: 0.05 to 0.30%, O (oxygen): not more than 0.01%, B: 0.0003 to 0.003%, N: not more than 0.010%, one element selected from Cr: 0.2 to 2.0%, Nb: 0.002 to 0.1%, Ti: 0.002 to 0.1%, Zr: 0.002 to 0.1% and Ca: 0.0003 to 0.01%, and the balance Fe and impurities, and the said steel having tensile strength of not less than 900 MPa, wherein the content of Mo and V satisfy the following formula (1):

$$[Mo(\%)]\cdot[V(\%)]^{0.2} \geq 0.4 \qquad (1).$$

5. A container for high-pressure hydrogen, made of a low alloy steel consisting of, by mass percent, C: 0.38 to 0.60%, Si: 0.05 to 0.5%, Mn: 0.05 to 3.0%, P: not more than 0.025%, S: not more than 0.010%, Al: 0.005 to 0.10%, Mo: 0.5 to 3.0%, V: 0.05 to 0.30%, O (oxygen): not more than 0.01%, N: not more than 0.03%, two elements selected from Cr: 0.2 to 2.0%, Nb: 0.002 to 0.1%, Ti: 0.002 to 0.1%, Zr: 0.002 to 0.1% and Ca: 0.0003 to 0.01%, and the balance Fe and impurities, and the said steel having a tensile strength of not less than 900 MPa, wherein the contents of Mo and V satisfy the following formula (1):

$$[Mo(\%)]\cdot[V(\%)]^{0.2} \geq 0.40 \qquad (1).$$

6. A container for high-pressure hydrogen, made of a low alloy steel consisting of, by mass percent, C: 0.38 to 0.60%, Si: 0.05 to 0.5%, Mn: 0.05 to 3.0%, P: not more than 0.025%, S: not more than 0.010%, Al: 0.005 to 0.10%, Mo: 0.5 to 3.0%, V: 0.05 to 0.30%, O (oxygen): not more than 0.01%, B: 0.0003 to 0.003%, N: not more than 0.010%, two elements selected from Cr: 0.2 to 2.0%, Nb: 0.002 to 0.1%, Ti: 0.002 to 0.1%, Zr: 0.002 to 0.1% and Ca: 0.0003 to 0.01%, and the balance Fe and impurities, and the said steel having a tensile strength of not less than 900 MPa, wherein the contents of Mo and V satisfy the following formula (1):

$$[Mo(\%)]\cdot[V(\%)]^{0.2} \geq 0.40 \qquad (1).$$

* * * * *